(12) United States Patent
Park

(10) Patent No.: US 9,188,282 B2
(45) Date of Patent: Nov. 17, 2015

(54) STRUCTURE FOR PREVENTING SURGE OF 2-CYLINDER ENGINE

(75) Inventor: Sung Youb Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 529 days.

(21) Appl. No.: 13/315,182

(22) Filed: Dec. 8, 2011

(65) Prior Publication Data

US 2013/0081597 A1    Apr. 4, 2013

(30) Foreign Application Priority Data

Sep. 29, 2011    (KR) .................. 10-2011-0099338

(51) Int. Cl.
| F02D 13/06 | (2006.01) |
| F02B 75/18 | (2006.01) |
| F16N 3/12 | (2006.01) |
| F02B 33/02 | (2006.01) |
| F02B 75/16 | (2006.01) |
| F02M 35/10 | (2006.01) |

(52) U.S. Cl.
CPC . *F16N 3/12* (2013.01); *F02B 33/02* (2013.01); *F02B 75/16* (2013.01); *F02D 13/06* (2013.01); *F02M 35/10255* (2013.01); *F02B 2075/1808* (2013.01); *Y02T 10/18* (2013.01)

(58) Field of Classification Search
CPC ............ F02M 21/0218; F02M 21/029; F02M 35/104; F02M 13/00; F02M 13/022; F02M 13/0416; F02M 13/02; F02M 13/021; F02M 2013/0083; F02M 2013/0038; F02M 25/0749; F02M 25/0752; F02D 2250/08; F02D 2250/41; F02D 9/10; F02B 2075/025; F02B 2075/00; F02B 2075/027; F02B 61/02; F02B 25/12; F02B 19/06; F02B 75/065; F02B 75/32; F02B 25/00; F02B 75/246; F02B 75/28; F02B 3/06; F02B 75/18; F02B 2075/182; F02B 2075/1824; F02B 2075/1832; F02B 2075/1848; F02B 1/00; F02B 75/20; F02B 2275/22; F02B 27/04; F02B 75/222; F02B 75/22; F02B 5/222; F01L 7/024; F01L 5/04; F01L 5/02; F02F 7/0019; F01B 3/045; F01B 9/06; F01B 3/06

See application file for complete search history.

(56) References Cited

U.S. PATENT DOCUMENTS

| 4,194,470 A * | 3/1980 | Magner ...................... 123/73 A |
| 4,716,877 A * | 1/1988 | Duret ............................ 123/531 |
| 4,770,132 A * | 9/1988 | Sougawa .................... 123/73 A |
| 4,920,930 A * | 5/1990 | Sakano .................. F01M 13/04 123/41.86 |
| 5,579,735 A * | 12/1996 | Todero et al. ................. 123/317 |

(Continued)

FOREIGN PATENT DOCUMENTS

| JP | 07-317549 A | 5/1995 |
| JP | 07-269356 A | 10/1995 |
| JP | 4153667 B2 | 9/2008 |

*Primary Examiner* — Hung Q Nguyen
*Assistant Examiner* — Brian P Monahon
(74) *Attorney, Agent, or Firm* — Morgan, Lewis & Bockius LLP

(57) ABSTRACT

A structure for preventing surge of a 2-cylinder engine may include a first line communicating a crank room of the engine with a cylinder head cover, a first valve which may be disposed on the first line and allows a fluid within the crank room to flow into the cylinder head cover, a second line communicating the crank room of the engine with an intake manifold and a second valve which may be disposed on the second line and allows a fluid within the intake manifold into the crank room.

6 Claims, 3 Drawing Sheets

(56) References Cited

U.S. PATENT DOCUMENTS

| | | | |
|---|---|---|---|
| 5,613,468 A * | 3/1997 | Ibara et al. | 123/73 A |
| 5,690,063 A * | 11/1997 | Motoyama et al. | 123/73 A |
| 6,062,179 A * | 5/2000 | Gohara et al. | 123/73 A |
| 6,109,223 A * | 8/2000 | Motoyama et al. | 123/73 A |
| 6,435,170 B1 * | 8/2002 | Hamelink | F01M 13/04 123/572 |
| 6,450,135 B1 * | 9/2002 | Araki | 123/73 B |
| 7,096,850 B2 * | 8/2006 | Yashirodai et al. | 123/317 |
| 2006/0150930 A1 * | 7/2006 | Swenson | 123/59.1 |
| 2008/0083381 A1 * | 4/2008 | Kirchberger | 123/73 A |
| 2009/0138174 A1 * | 5/2009 | Nishida et al. | 701/103 |

* cited by examiner

STRUCTURE FOR PREVENTING SURGE OF 2-CYLINDER ENGINE

CROSS-REFERENCE TO RELATED APPLICATION

The present application claims priority to Korean Patent Application No. 10-2011-0099338 filed in the Korean Intellectual Property Office on Sep. 29, 2011, the entire contents of which is incorporated herein for all purposes by this reference.

BACKGROUND OF THE INVENTION

1. Field of the Invention

The present invention relates to a structure for preventing surge of a 2-cylinder engine. More particularly, the present invention relates to a structure for preventing surge of a 2-cylinder engine which may prevent sharp pressure rising and descending within a crank room when 2 pistons of the engine moves up and down simultaneously and surge generated in an intake manifold.

2. Description of Related Art

In a general 2-cylinder engine, a first and a second piston are simultaneously and reciprocally moved for balancing in cranking.

That is, when a first cylinder is operated sequentially from intake stroke (piston descending), compression stroke (piston rising), explosion stroke (piston descending) and exhaust stroke (piston rising), a second cylinder is operated sequentially from explosion stroke (piston descending), exhaust stroke (piston rising), intake stroke (piston descending) and compress stroke (piston rising).

And thus, since two pistons of the 2-cylinder engine moves to the same direction simultaneously, so that when the pistons descend, pressure within a crank room is rapidly increased and negative pressure is created when the pistons rise.

Also, as shown in FIG. 1, the first cylinder and the second cylinder forms 1 cycle intake stroke during a 720 degree interval. From about 240 degree to about 480 degree, it is a deactivation of an intake valve and at this moment air compressed by a turbocharger is accumulated in the intake manifold.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure for preventing surge of a 2-cylinder engine which may prevent sharp pressure rising and descending within a crank room when 2 pistons of the engine moves up and down simultaneously and surge is generated in an intake manifold.

In an aspect of the present invention, a structure for preventing surge of a 2-cylinder engine may include a first line fluid-communicating a crank room of the engine with a cylinder head cover; and a first valve which is disposed on the first line and allows a fluid within the crank room to flow into the cylinder head cover.

The structure further includes: a second line fluid-communicating the crank room of the engine with an intake manifold; and a second valve which is disposed on the second line and allows a fluid within the intake manifold into the crank room.

The first valve and the second valve are a one-way valve which allows the fluid to only one direction.

The second line is diverged from the first line and connected to the intake manifold.

The first line and the second line are independently mounted.

2 pistons of the engine moves up and down simultaneously.

In another aspect of the present invention, a structure for preventing surge of a 2-cylinder engine may include a second line fluid-communicating the crank room of the engine with an intake manifold; and a second valve which is disposed on the second line and allows a fluid within the intake manifold into the crank room.

2 pistons of the engine moves up and down simultaneously.

As described above, a structure for preventing surge of a 2-cylinder engine according to the exemplary embodiment of the present invention may prevent sharp pressure rising (surge) in a crank room when pistons descend and may prevent excessive negative pressure generating in a crank room when pistons descend.

Also, during deactivation of an intake valve, air accumulated in the intake manifold may be released so that an intake stroke may be easily realized.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
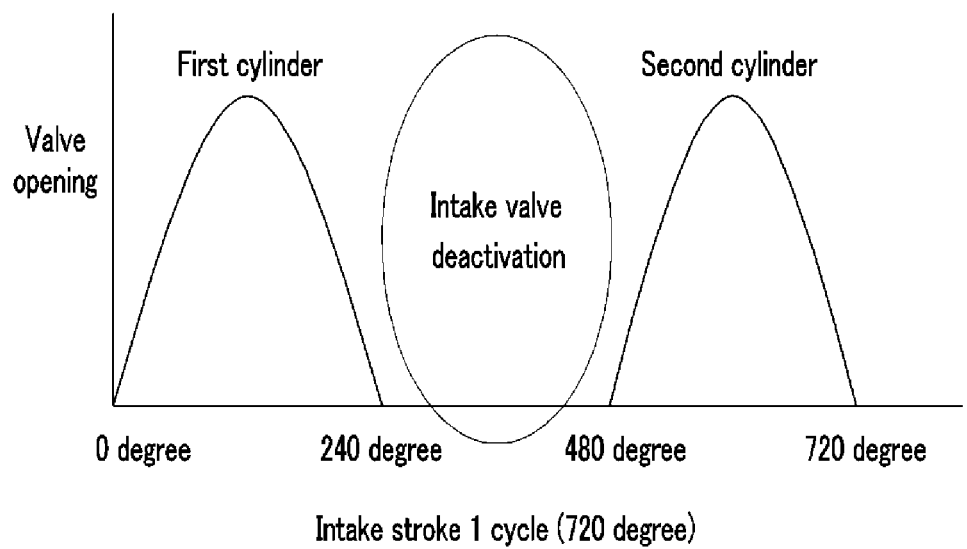
FIG. 1 is a graph of a 1 cycle intake stroke stroke.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Figure 2:
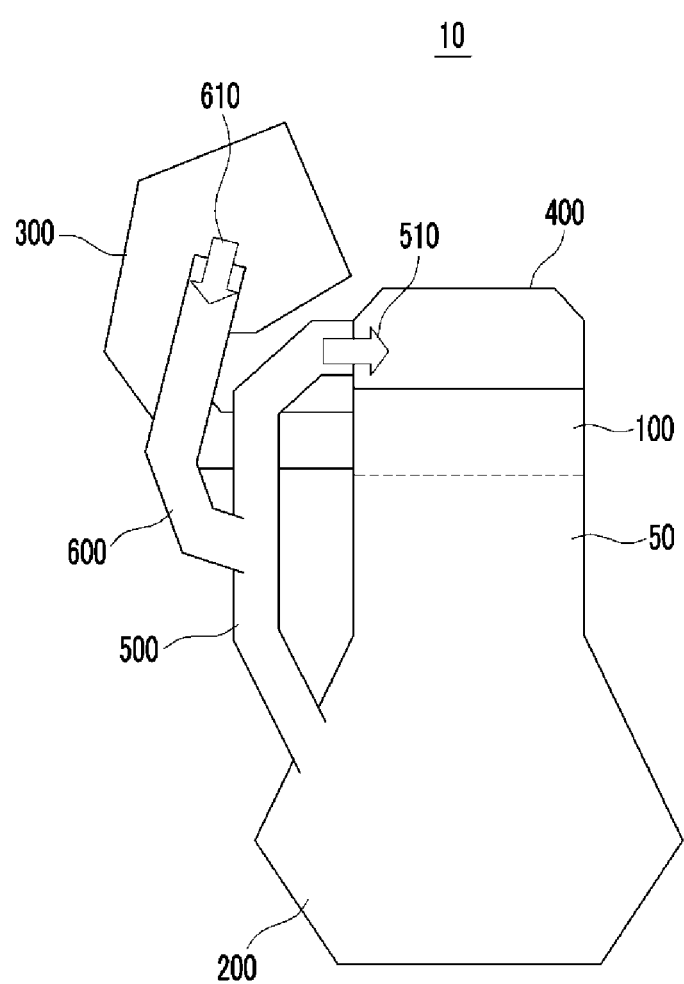
FIG. 2 is a structure for preventing surge of a 2-cylinder engine according to an exemplary embodiment of the present invention.

A structure for preventing surge of a 2-cylinder engine according to an exemplary embodiment of the present, as shown in FIG. 2, includes a first line 500 communicating a crank room 200 of an engine 10 with a cylinder head cover 400, a first valve 510 which is disposed on the first line 500, a second line 600 communicating the crank room 200 of the engine 10 with an intake manifold 300 and a second valve 610 which is disposed on the second line 600.

The first line 500, as shown in FIG. 2, connects the crank room 200 and the cylinder head cover 400 of the 2-cylinder engine 10.

Since two pistons of the 2-cylinder engine moves to the same direction simultaneously, so that when the pistons descend, pressure within a crank room is rapidly increased and it is called a surge. And thus, in the present exemplary embodiment, the first line 500 is provided with for communicating the crank room 200 with the cylinder head cover 400 and thus the pressure within crank room 200 may be released through the first line 500 to the cylinder head cover 400.

The first valve 510, disposed on the first line 500, is a one-way valve such as a check valve which allows the fluid to flow only from the crank room 200 to the cylinder head cover 400.

If a fluid flows from the cylinder head cover 400 to the crank room 200, pressure within the crank room 200 is further raised. And thus the first line 500 is provided for releasing partial pressure within the crank room 200 to the cylinder head cover 400 to prevent surge. And thus, in the present exemplary embodiment the first valve 510 may be a one-way valve allowing a fluid to flow only from the crank room 200 to the cylinder head cover 400.

The second line 600 is provided for communicating the intake manifold 300 of the engine 10 with the crank room 200 of the engine 10 to prevent creating negative pressure within the crank room 200 when pistons of the engine 10 rise.

Since two pistons of the 2-cylinder engine 10 moves to the same direction simultaneously, so that negative pressure is created within the crank room 200 when the pistons rise. And thus the second line 600 is provided for communicating the intake manifold 300 with the crank room 200 so that a fluid (air) flows from the intake manifold 300 to the crank room 200 to release excessive negative pressure.

As shown in FIG. 2, according to an exemplary embodiment, the intake manifold 300 may be mounted to a side of the cylinder head 100 disposed on upper portion of the cylinder 50.

Due to the second line 600 connected to the intake manifold 300, air flows into the crank room 200 so as to increase pressure within the crank room 200 and prevent creating negative pressure when two pistons of the 2-cylinder engine 10 moves up.

In the present exemplary embodiment the second valve 610, disposed on the second line 600, may be a one-way valve allowing a fluid to flow only from the intake manifold 300 to the crank room 200.

If the second valve 610 is a one-way valve, air is allowed to flow only from the intake manifold 300 to the crank room 200. On the contrary, if air flows from the crank room 200 to the intake manifold 300, pressure within the crank room 200 may be decreased further, so that to prevent creating negative pressure within the crank room 200 and thus the second valve 610 may be a one-way valve allowing a fluid to flow only from the intake manifold 300 to the crank room 200.

The second line 600 may be formed independent from the first line 500 or may be diverged from the first line 500.

Figure 3:
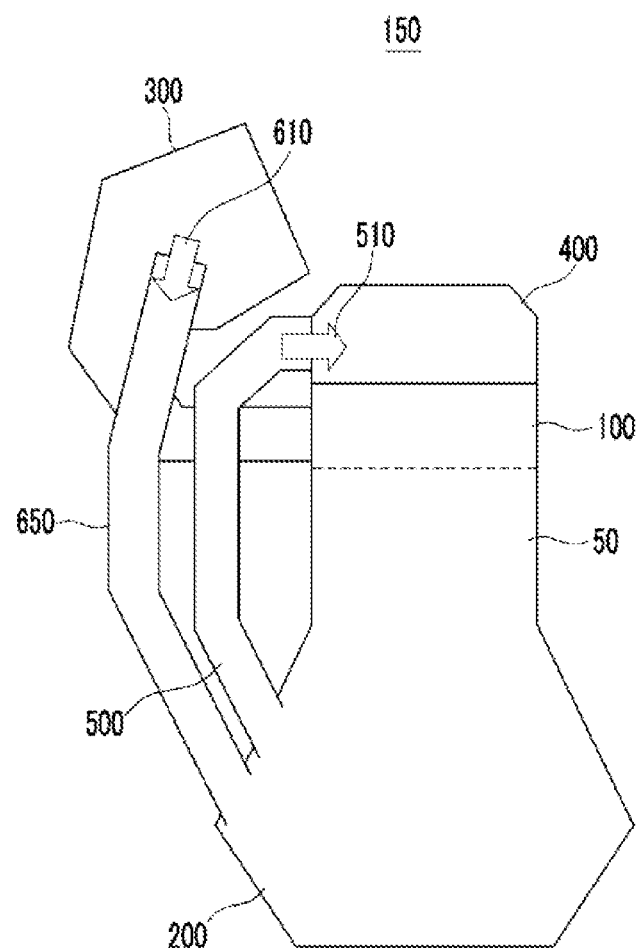
FIG. 3 is a structure for preventing surge of a 2-cylinder engine according to a modified embodiment of the present invention.

As shown in FIG. 3, in another exemplary embodiment of an engine 100, the second line 650 may be formed independent from the first line 500, and in an exemplary embodiment as shown in FIG. 2, the second line 650 may be diverged from the first line 500 connecting the crank room 200 and the cylinder head cover 400 and may be connected to the intake manifold 300.

When the first valve 510 and the second valve 610 are disposed on the first line 500 and the second line 650 respectively as a one-way valve, the second line 650 formed independently from the first line 500 or diverged from the first line 500 may have the same effect to prevent the surge.

When two pistons descend, the fluid may flow from the crank room 200 to the cylinder head cover 400 due to the first valve 510 (one-way valve) and the flow may not flow from the crank room 200 to the intake manifold 300 due to the second valve 610 (one-way valve). That is, the fluid may not flow through the second line 650, and thus it is the same as if only the first line 500 is provide to the 2-cylinder engine. Also, when two pistons ascend, the fluid may flow from the intake manifold 300 to the crank room 200 due to the second valve 610 (one-way valve) and the flow may not flow from the crank room 200 to the cylinder head cover 400 due to the first valve 510 (one-way valve). That is, the fluid may not flow through the first line 500, and thus it is the same as if only the second line 650 is provided to the 2-cylinder engine. So that when the first valve 510 and the second valve 610 are disposed on the first line 500 and the second line 650 respectively as a one-way valve, the second line 650 formed independently from the first line 500 or diverged from the first line 500 may have the same effect to prevent the surge.

If the second line 650 is diverged from the first line 500, a space occupied by the lines are less than that is formed independently, and thus special capabilities may be enhanced.

As described above, the structure for preventing surge of a 2-cylinder engine according to the exemplary embodiments of the present invention may release pressure within the crank room 200 through the first valve 510 to the cylinder head cover 400 when the pistons descend, and also may compensate negative pressure within the crank room 200 by inflowing the air from the intake manifold 300 to the crank room 200 through the second valve 610.

Also, as shown in FIG. 1, during deactivation of an intake valve, air accumulated in the intake manifold 300 may be released to the crank room 200 through the second valve 610 so that intake stroke may be easily realized.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A structure for preventing surge of a two-cylinder engine comprising:
   a first line directly supplying a first fluid of a crank room into a cylinder head cover; and
   a first valve which is disposed on the first line and allows the first fluid within the crank room to flow into the cylinder head cover;
   a second line supplying a second fluid of an intake manifold into the crank room wherein the second line diverges from a portion of the first line and connects to the intake manifold, the portion of the first line disposed partway between a distal end and a proximate end of the first line; and
   a second valve which is disposed on the second line and allows the second fluid within the intake manifold into the crank room;
   wherein the first valve and the second valve are one-way valves which allow each of the first and second fluids to flow in only one direction, and
   wherein the first valve is disposed on the distal end of the first line and adjacent to the cylinder head cover.

2. The structure for preventing surge of claim 1, wherein the first line and the second line are independently mounted.

3. The structure for preventing surge of claim 1, wherein two pistons of the engine move up and down simultaneously.

4. A structure for preventing surge of a two-cylinder engine comprising:
   a first line directly supplying a first fluid of a crank room into a cylinder head cover; a first valve which is disposed on the first line and allows the first fluid within the crank room to flow into the cylinder head cover;
   a second line fluid-communicating the crank room of the engine with an intake manifold wherein the second line diverges from a portion of the first line, the portion of the first line disposed partway between a distal end and a proximate end of the first line; and
   a second valve which is disposed on the second line and allows a second fluid within the intake manifold into the crank room;
   wherein two pistons of the engine move up and down simultaneously, and
   wherein the first valve is disposed on the distal end of the first line and adjacent to the cylinder head cover.

5. The structure for preventing surge of claim 1, wherein during deactivation of an intake valve, air accumulated in the intake manifold is released to the crank room through the second valve and negative pressure within the crank room is compensated; and
   pressure is released within the crank room through the first valve to the cylinder head cover when the pistons descend.

6. The structure for preventing surge of claim 4, wherein during deactivation of an intake valve, air accumulated in the intake manifold is released to the crank room through the second valve and negative pressure within the crank room is compensated; and
   pressure is released within the crank room through the first valve to the cylinder head cover when the pistons descend.

* * * * *